United States Patent [19]

Hirsch

[11] 4,396,149

[45] Aug. 2, 1983

[54] IRRIGATION CONTROL SYSTEM

[75] Inventor: Michael Hirsch, Pacific Palisades, Calif.

[73] Assignee: Energy Management Corporation, Gardena, Calif.

[21] Appl. No.: 221,519

[22] Filed: Dec. 30, 1980

[51] Int. Cl.³ .................. A01G 25/16; B05B 12/12
[52] U.S. Cl. ................... 239/63; 137/78.3; 239/64; 239/69; 239/71
[58] Field of Search ............. 73/73; 340/601, 602, 340/604; 137/78.2, 78.3, 78.5, 624.11; 239/63–65, 69, 71

[56] References Cited

U.S. PATENT DOCUMENTS

| 3,024,372 | 3/1962 | Seele. | |
|---|---|---|---|
| 3,079,089 | 2/1963 | Tomayer. | |
| 3,113,724 | 12/1963 | DeBough | 239/63 |
| 3,114,243 | 12/1963 | Winters | 239/63 X |
| 3,195,816 | 7/1965 | Mercer | 239/63 |
| 3,238,392 | 3/1966 | Richards. | |
| 3,297,254 | 1/1967 | Coffman | 239/63 |
| 3,438,575 | 4/1969 | Rohling. | |
| 3,463,396 | 8/1969 | Borel. | |
| 3,488,000 | 1/1970 | Cramer | 239/63 |
| 3,500,844 | 3/1970 | Sanner. | |
| 3,553,481 | 1/1971 | Hasenbeck | 239/63 X |
| 3,603,951 | 9/1971 | Bracken et al. | 340/601 X |
| 3,626,286 | 12/1971 | Rauchwerger | 239/63 X |
| 3,642,204 | 2/1972 | McCloskey | 239/63 |
| 3,747,399 | 7/1973 | Treirat | 73/73 |
| 3,847,351 | 11/1974 | Hasenbeck | 239/63 |
| 3,874,590 | 4/1975 | Gibson | 73/73 X |
| 3,905,551 | 9/1975 | Chevrelière | 239/63 |
| 3,906,978 | 9/1975 | Kurz | 239/63 X |
| 3,910,300 | 10/1975 | Tal | 73/73 X |
| 3,991,939 | 11/1976 | Maclay | 239/63 |
| 4,026,467 | 5/1977 | Chevrelière | 239/63 |
| 4,114,647 | 9/1978 | Sturman et al. | 239/63 X |
| 4,197,866 | 4/1980 | Neal | 239/63 |
| 4,209,131 | 6/1980 | Barash et al. | 239/69 X |
| 4,256,133 | 3/1981 | Coward et al. | 239/64 X |

FOREIGN PATENT DOCUMENTS

1165652 10/1969 United Kingdom ............. 239/63

Primary Examiner—Andres Kashnikow
Attorney, Agent, or Firm—William W. Haefliger

[57] ABSTRACT

Irrigation control apparatus includes a mast or masts, a soil moisture sensor or sensors associated with a lower portion of each mast, data transmission apparatus associated with an upper portion of each mast to transmit data continuously measured by the sensor, and circuitry to process that transmitted data.

23 Claims, 9 Drawing Figures

IRRIGATION CONTROL SYSTEM

BACKGROUND OF THE INVENTION

This invention relates generally to irrigation management, and more particularly concerns a system which conserves water and energy by providing optional or highly efficient irrigation to growing plants.

The most basic form of present irrigation control involves a decision by a human to begin or discontinue application of irrigation water. The effects of under-irrigation are obvious in that plant condition suffers; however, in many cases over irrigation does not cause apparent harm to the plants. In such a case, the major harm caused by over-irrigation is the waste of irrigation water and the energy required for its distribution. Additionally, however, there may be subtle but significant impairment of plant growth.

Several methods have in the past been developed to improve the efficiency of irrigation and at the same time minimize the burden on human operators. One technique is the use of preprogrammed timers to automatically start and terminate irrigation. Such timer systems can be enhanced to provide for multiple timing cycles which vary in accordance with plant growth cycles. However, such systems have the limitation that there is no feedback between actual plant water consumption and water application. For example, timer systems are unable to reduce water application during times of humid or rainy weather, and do not account for variable water requirements.

Because of these limitations, systems which measure free soil moisture were devised. Such systems measure soil moisture in a variety of ways, including soil electrical conductivity, and by use of tensiometers. Typically, water application is commenced when the soil moisture is diminished to a preset level; and discontinued irrigation when the moisture again rises to a predetermined level. Such operation has several limitations, relating primarily to the time delay between the application of irrigation water, and the measurement of changes in the soil moisture at depth. For example, the moisture sensors at depth may still be wet when shallower plant roots are already becoming dry. Similarly, the irrigation water may not have reached the sensors even when the surface has been flooded with water.

Efforts to overcome these problems have involved the combining of timers with soil moisture sensors. In such systems, the timers actuate irrigation at predetermined times, but only if the moisture soil sensors indicate that the soil has become dry. The timers eliminate the danger of overwatering while waiting for moisture to penetrate to the sensors. Still, they are not responsive to changes in weather, nor can they sense any characteristics other than the simple value of the soil moisture.

Another broad aspect which has been addressed previously is the concept of using telemetry to acquire data from the agricultural field, and to use data to obtained to actuate irrigation controllers. Systems described heretofore, however, lack sufficient control.

SUMMARY OF THE INVENTION

It is a major object of the present invention to provide an irrigation control system, and components of such a system, which overcome the deficiencies of prior control systems and efforts, and to provide optimal irrigation to growing plants.

Viewed in its system aspects, the present invention incorporates:

1. multiple sensors measuring soil moisture at various appropriate depths and sites in a field or fields;
2. weather measurement equipment associated with the field or fields;
3. apparatus and method to telemeter soil moisture and weather data from measurement sites to a central computer;
4. computer means equipped to receive and transmit data, and programmed with instructions and data which compute optimal irrigation strategy;
5. apparatus and method to display the measured data and the computed irrigation strategy to a human operator;
6. apparatus and method to telemeter actuation commands from the computer to irrigation controls; and
7. apparatus and method to control the flow of irrigation water as directed by the telemetered commands.

More specifically, the soil measurement sensors, weather measurement equipment and telemetering apparatus may be incorporated on multiple stations spaced apart in a field, each station including a mast, the lower end of which is adapted to be removably inserted into the earth to expose the sensors to soil moisture conditions; and the computer means may include a field computer unit and associated telemetry devices. This field computer unit is programmed with instructions and data to compute optimal irrigation, and it is also equipped with data terminals which allow it to communicate with humans, such as the farmer.

These and other objects and advantages of the invention, as well as the details of an illustrative embodiment, will be more fully understood from the following description and drawings, in which:

DETAILED DESCRIPTION

Figure 1:
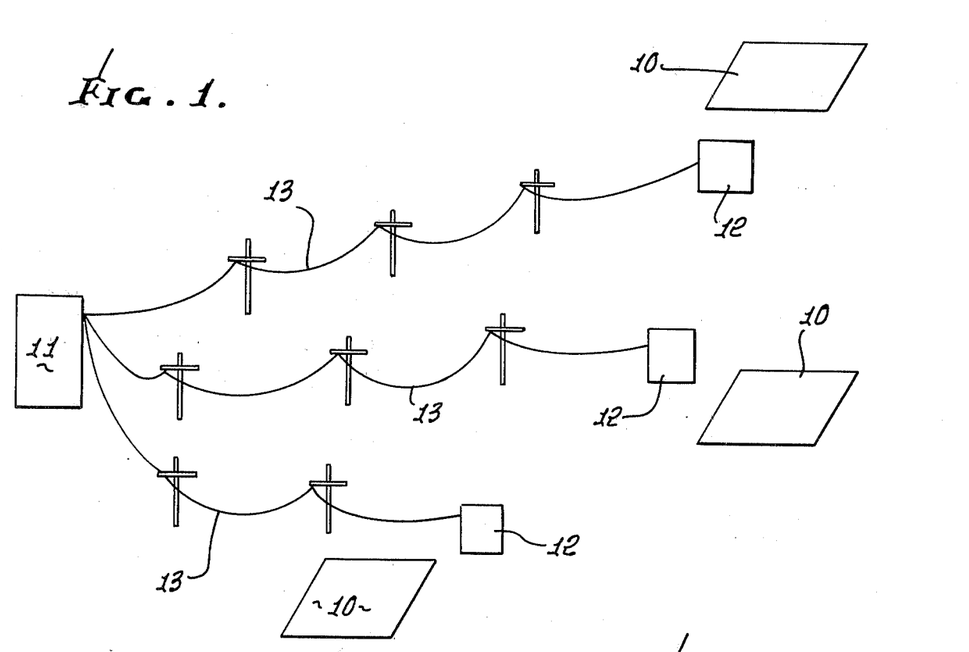
FIG. 1 is a schematic view of a system incorporating the invention.

Referring first to FIG. 1, farms or fields are shown at 10, with a remote central computer at 11. Remote computers 12 are associated with the farms. The central computer 11 serves to provide backup data storage; and to provide updated information to the remote computers. Transmission between the remote computers and the central computer is via ordinary telephone lines, indicated at 13. Each remote computer can handle many separate fields at a farm.

Figure 2:
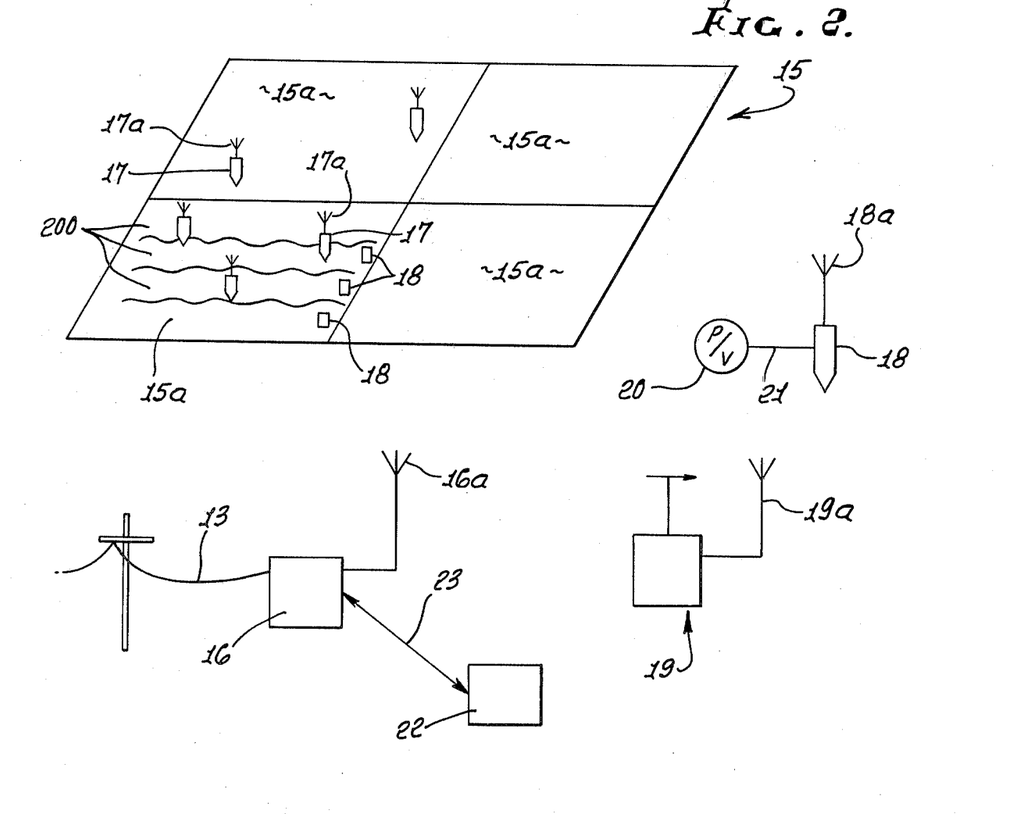
FIG. 2 is a schematic view of a typical farm incorporating the invention.

In FIG. 2 a typical farm 15 includes several fields 15a. Associated with each farm 15 is a remote computer 16 which is able to communicate via radio or other means with various sensor and control units 17 and 18 located throughout the farm or fields. Each field is typically instrumented with several soil sensor stations or units; in FIG. 2, three such soil sensor stations are shown in one field and spaced along and between crop rows 200. In actual practice, many fields could be instrumented, and with as many sensor stations as are needed to characterize that field, i.e. to develop soil moisture data characteristic of the field.

Additionally, a weather station 19 is provided and may be located in any field. This station supplies data including, but not limited to: temperature, humidity wind velocity, wind direction, insolation (sun intensity), and rainfall amount. Antennas associated with the described elements are indicated at 16a, 17a, 18a and 19a.

Also, the system is able to control irrigation (start and stop pumps, open and close valves, etc.) for those farms where such facilities are available. See for example pump or valve 20 connected at 21 with controller 18. The pump or valve typically controls water flow to one or more of the fields 15a.

There is also means (for example telephone or radio 22, and link 23) for the system to communicate with the farmer or other human. This capability allows the farmer to obtain reports on the system's operation, to manually override the system's activities (for example, to inhibit irrigation in a field where harvesting is planned); and for those farms where automatic control of pumps or valves is unavailable, to advise the farmer of recommended irrigation schedules.

Figure 3:
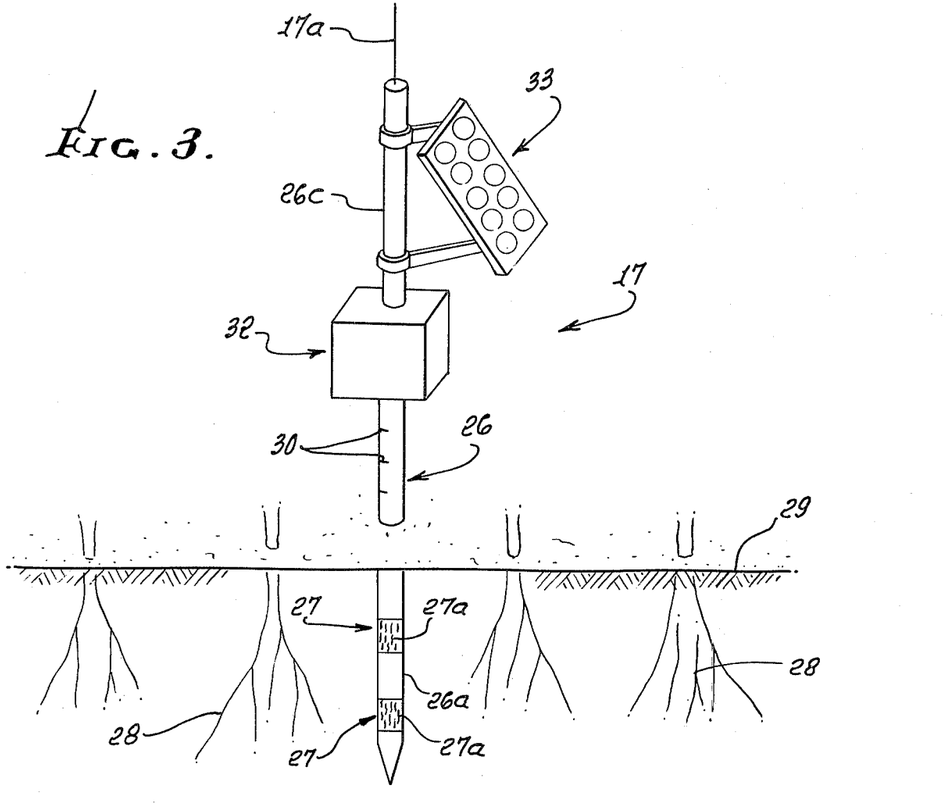
FIG. 3 is an elevational view of a soil sensor station as incorporated in FIG. 2.

FIG. 3 shows a typical portable soil sensor station 17. It comprises a self-contained unit which is placed in the field, and operates to telemeter data indicative of the moisture level in the soil in the vicinity of the active region of the crop roots at that portion of the field where the station is located.

The station is designed so that it can be easily installed in the field, and easily removed, so as to facilitate harvesting and field preparation. The support shaft or mast 26 has a lower portion 26a incorporating or carrying the moisture sensitive elements 27a of the tensiometers 27.

The tensiometer elements are placed in proximity with the active areas of the plant roots 28 as by implanting the lower portion 26a underground, i.e. below ground level 29. Note tapered lower portion of that mast, easily forced into the earth. Markers 30 on the mast indicate depth of soil penetration. The units 17 may be placed along rows of planted crops, and the construction described above allows the sensors to take up a minimum of space along the rows, with minimum interference with farm operations.

The support shaft or mast 26 also has an upper or above ground portion 26c which provides a mounting means for: a radio antenna 17a or other means of telemetry; a protective case 32 which contains electrical components, such as transmitters, receivers; etc; and a solar panel 33 to provide electrical power to the electrical devices at the station 17.

Examples of usable tensiometers are those described in U.S. Pat. No. 3,224,676. Their vertical spacing enables ascertainment of soil moisture data at two depths, for establishing a moisture gradient.

Figure 4:
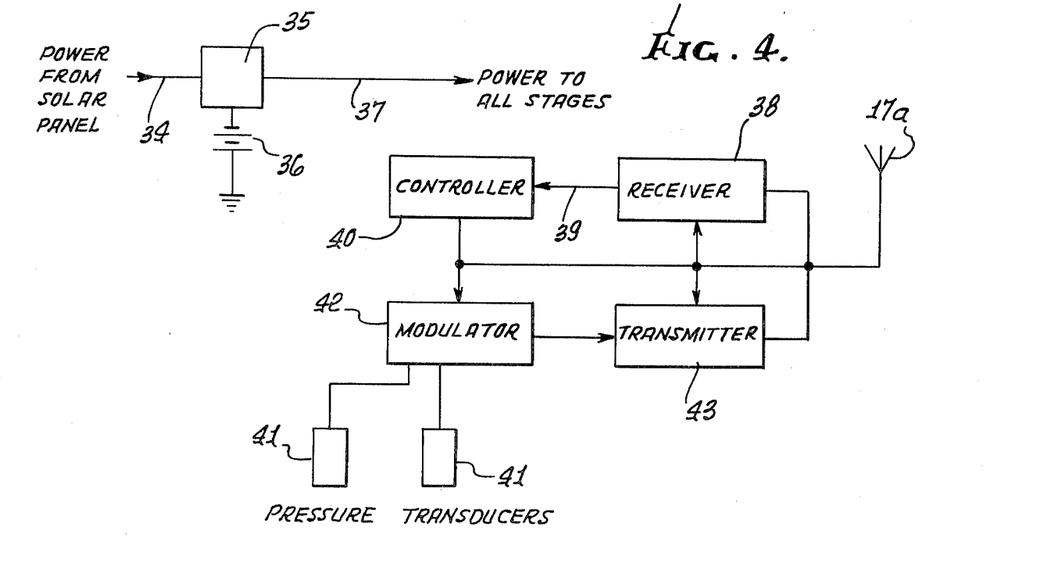
FIG. 4 is a block diagram showing electrical elements associated with the FIG. 3 station.

FIG. 4 illustrates the electrical components of a typical sensor station 17.

Power developed at the solar panel 33 is delivered at 34 to a voltage regulator circuit 35 and used to charge a rechargable battery 36. The system typically provides power without wires, and allows power availability during times without sunlight. Power from the rechargable battery is supplied at 37 to all other stages of the unit.

Commands from the remote computer 16 are received via antenna 17a and receiver-amplifier 38, and then sent at 39 to a controller 40. The latter verifies that the commands were addressed to that particular sensor station; and determines the measurement desired. When an appropriate activating command is received, the pressure in the tensiometers, as sensed by pressure transducers 41, is used to modulate the transmitted waveform. For example, the voltage outputs of transducers 41 modulate (at modulator 42) the waveform transmitted via transmitter 43). Thus, the pressure is telemetered back to the remote computer 16 upon command.

Figure 5:
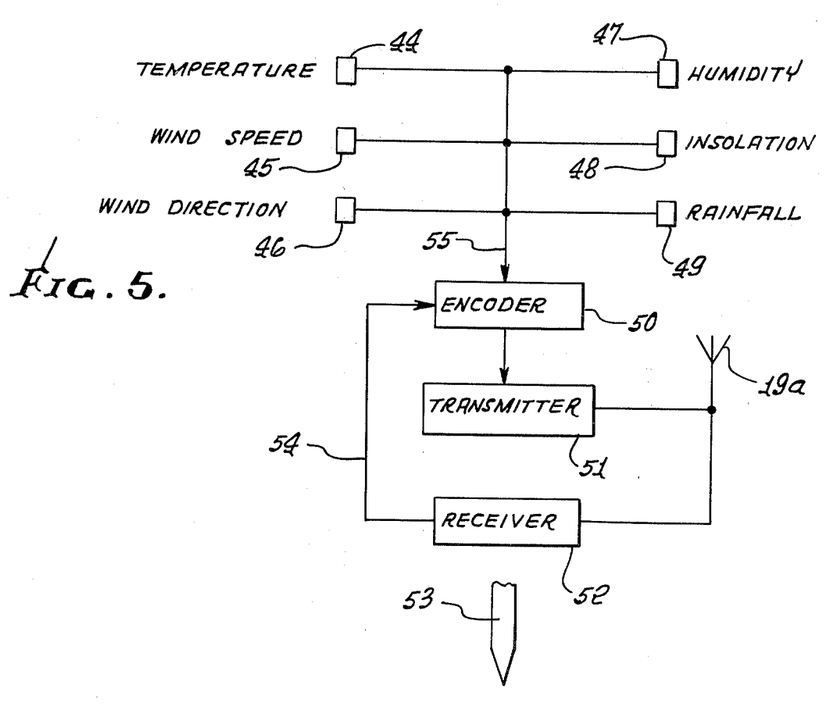
FIG. 5 is a block diagram showing electrical elements associated with the weather station illustrated in FIG. 2.

FIG. 5 shows a representation of the circuitry in the weather station 19. Data including, but not limited to, the following are collected by conventional instruments 44–49; temperature, windspeed, wind direction, humidity, insolation, and rainfall. These instruments, together with encoder 50, transmitter 51 and receiver 52 components are carried by a mast or shaft 53 (like shaft 26) and adapted to be removably implanted in the soil.

The remote computer 16 addresses the weather station through antenna 19a and the radio receiver 52, or other communication system as may be provided. Upon receipt of such a command, an enabling signal is transmitted at 54 to the encoder 50, enabling it to encode the collected weather data (fed to the encoder at 55), and transmit same to the remote computer (via transmitter 51 and antenna 19a).

Figure 6:
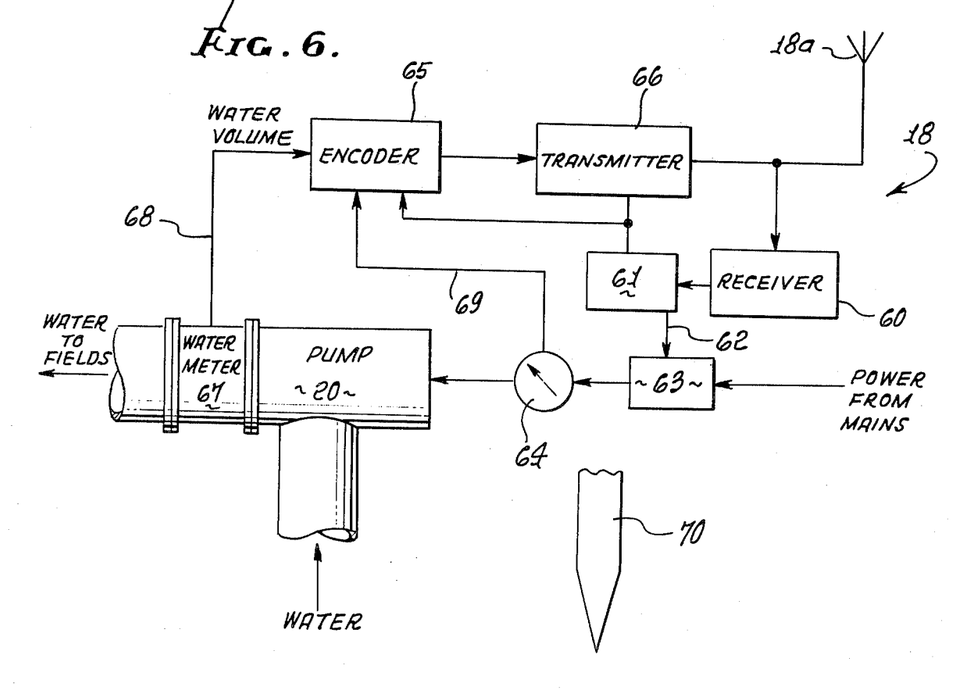
FIG. 6 is a block diagram showing electrical components incorporated in the pump control and monitor station illustrated in FIG. 2.

FIG. 6 shows a typical pump control/monitor station 18. Its purpose is to allow the remote computer to command the pumps to start or stop; and to allow data concerning the pump's operation to be transmitted to the remote computer.

Transmitted commands from the remote computer 16 are received via antenna 18a and receiver 60, and processed by a controller 61. Depending on the particular command, the controller can either control the pump; or it can collect data about the pump's operation. If the command is to control the pump, then controller 61 enables at 62 a power controller 63, which turns the power to the pump 20 on or off as appropriate. A power meter appears at 64.

If the received command is to collect data, then either the energy consumption or the water flow is encoded at 65 and telemetered at 66. Data from water meter 67 is transmitted at 68 to the encoder, and data from the power meter 64 is transmitted at 69 to the encoder.

The physical construction of the pump control/monitor station is similar to the soil sensor station shown in FIG. 3 i.e. the components 18a, and 60-69 may be carried by a mast or shaft 70 removably implanted in the soil, adjacent pump 20.

Figure 7:
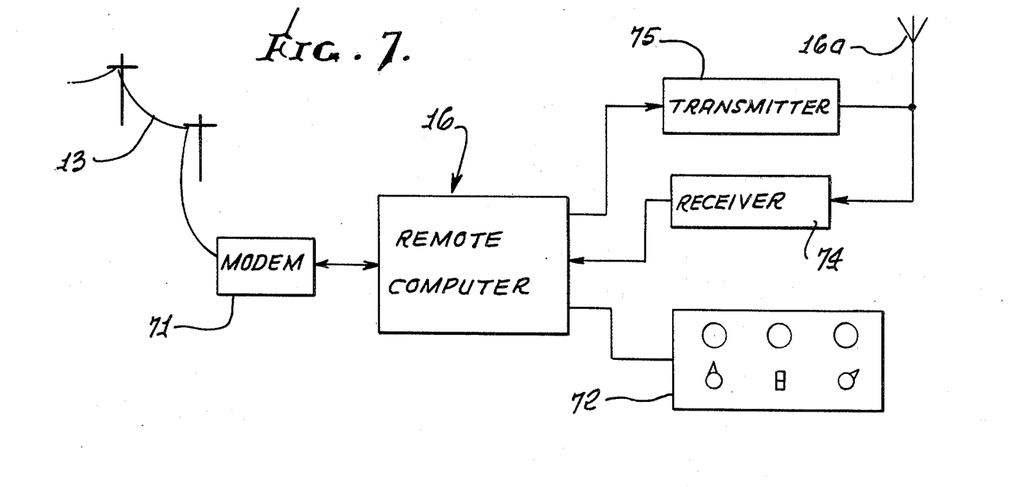
FIG. 7 is a block diagram showing a remote computer station.

FIG. 7 shows the remote computer 16, which collects data from the fields, makes decision about optimal irrigation strategy, communicates with the central computer, and communicates with the farmer. The internal characteristics of the remote computer are illustrated in the following figures.

The remote computer is able to communicate with the central computer using a modem (modulator-demodulator) 71 of conventional design, such as a Bell type 103. In turn, communication is through the existing telephone network 13.

Control/display function at 72 is provided using potentiometers, switches, dials, which indicate the status of the internal circuits and allow control thereof. A radio transmitter/receiver or other means of communication with the sensors and controllers in the field is provided by antenna 16a, receiver 74 and transmitter 75. In operation, data is collected in the computer memory from the soil sensors which indicates the free moisture in various portions of each field. Weather data is collected from the weather station. Means is provided to supply data to the computer indicative of the consumptive use characteristics of the crop (the variations in water consumption throughout the growing seasons). Characteristics such as soil type, irrigation flow rate, etc. are thereby applied. The farmer can provide additional information, such as "water now," "do not water," etc.

Using all the above factors, the remote computer develops a predictive model of the amount of soil moisture in each field; and predicts the optimal irrigation strategy. In this regard it is distinctive, and is predictive, rather than reactive.

Figure 8:
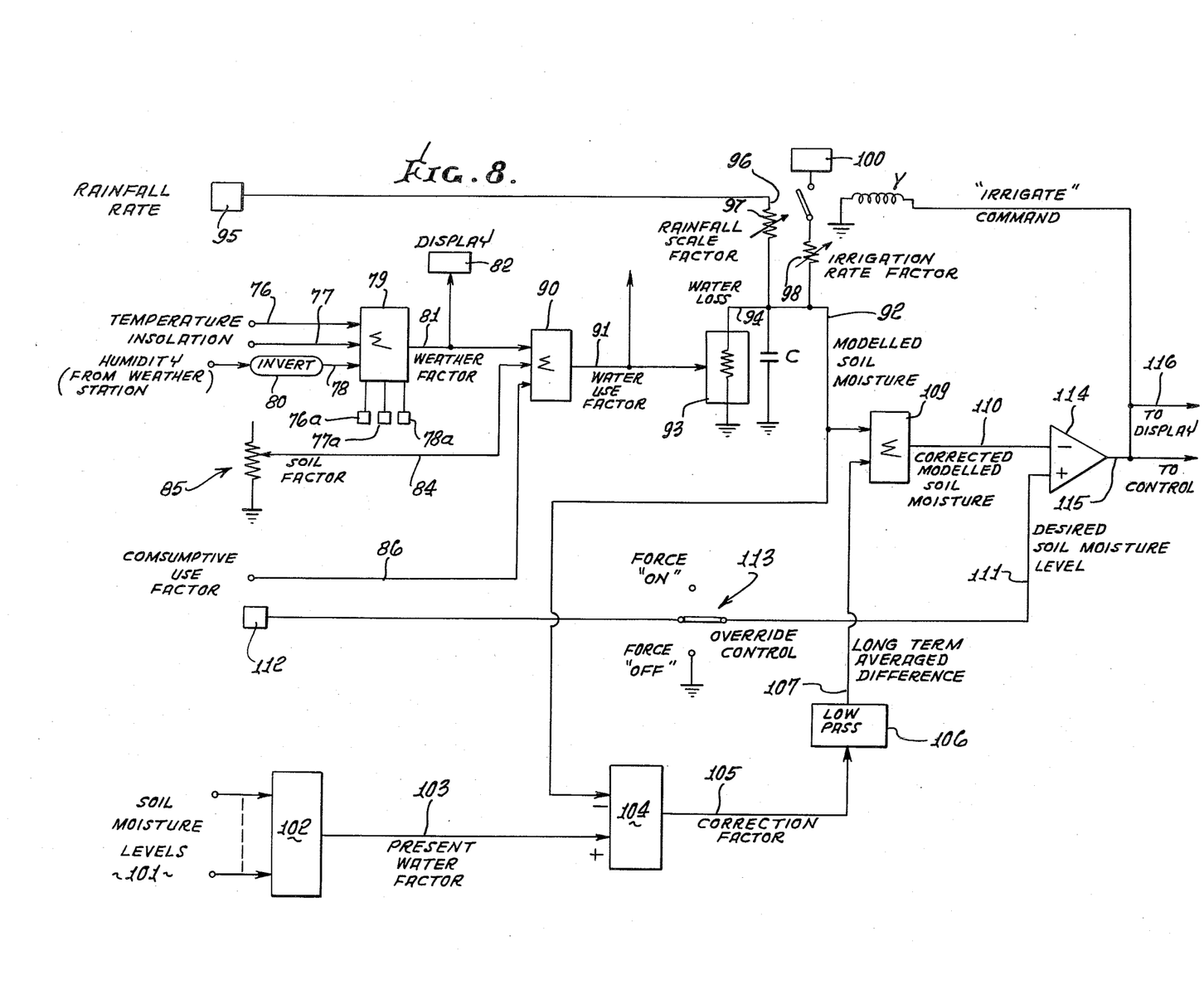
FIG. 8 is a predictive model circuit diagram implemented in the FIG. 7 remote computer.

The predictive model implemented in the remote computer can be implemented in many ways, and FIG. 8 shows one possible implementation using analog electronic circuits. Voltages corresponding to temperature, insolation (sun intensity) and humidity are derived from data collected by the weather station. These voltages supplied on lines 76–78 are summed at 79 with appropriate weighting. The humidity, in this case, would have a negative weight, represented by the invertor 80 in the figure. The exact weighting factors would vary from case to case, and can be varied as by controls 76a, 77a and 78a. The weighted summing can be implemented in several ways, one of which would be conventional operational amplifiers. The result of this weighted summing would be a voltage (transmitted at 81) which is an analog of the overall weather situation; hotter, dryer weather would in general be represented by a greater voltage. This signal is also optionally displayed at 82 to the human operator. It is labelled "weather factor" in the figure.

Another input to the system is a voltage (supplied at 84) which is an analog of the soil characteristics. Since this factor would be constant over extended periods of time, it may be set by a potentiometer 85. In the particular model shown, a higher voltage would be analogous to sandy soil, in which water was rapidly lost through downward percolation. A lower voltage would represent clayey soil which tended to retain water.

Figure 9:
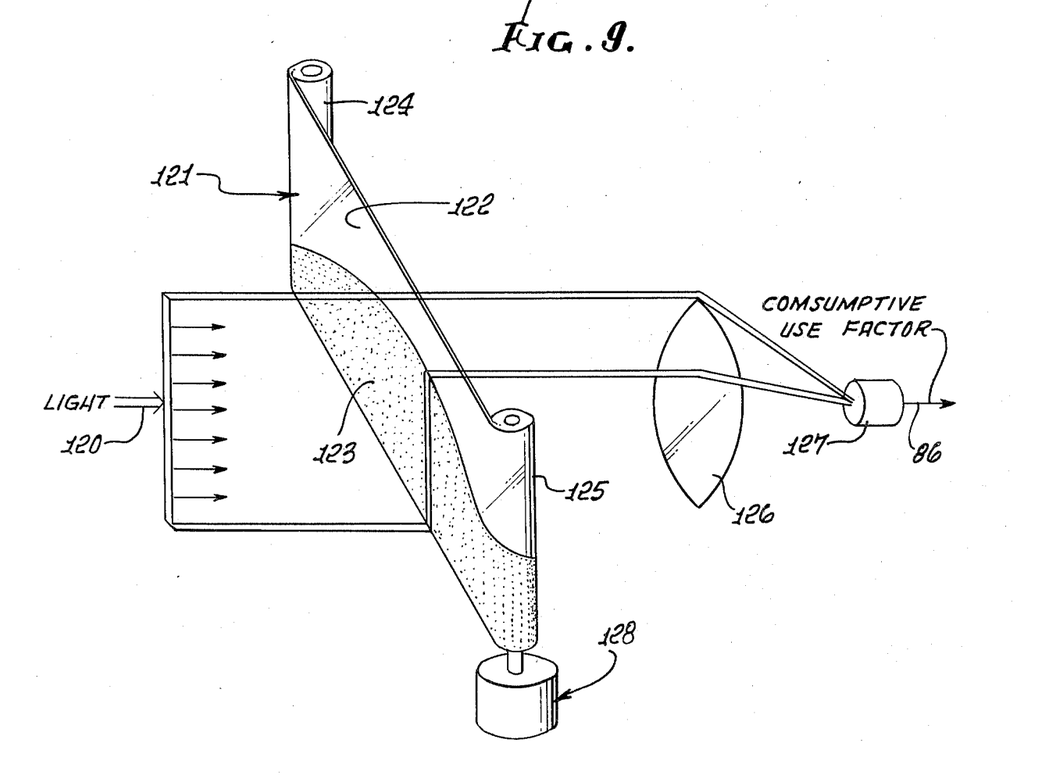
FIG. 9 is a perspective view of a signal generation means to develop signals as a function of consumptive use of water and desired moisture level.

A third input at 86 is a voltage analogous to the consumption use of the crop. This is labelled "consumptive use factor" in the figure. It corresponds to the rate at which water is consumed by the plants themselves. A greater voltage represents greater water consumption, such as during a very active growing phase. The consumptive use factor depends on the crop type, location, phase of the growing season, etc. FIG. 9 shows one means for developing this voltage analog.

The three factors described above—weather factor, soil factor, and consumptive use factor—are in turn processed by a weighted summing circuit 90. The output 91 of this circuit, labelled "water use factor" is an analog of the overall water lost from the soil for all reasons in the model.

A voltage is stored on capacitor C. This voltage appearing at 92 is labelled "modelled soil moisture," and is an analog of the estimate of the amount of water stored in the soil. The water use factor is used to control a voltage controlled resistor 93. A greater water use factor would cause the resistance to decrease. Such a decrease would cause capacitor C to discharge at a greater rate. The discharge current at 94 is labelled "water loss" in the figure. Thus, the foregoing is a model of the depletion of water from the soil.

In the particular model shown in the figure, water can be added to the soil from two sources: rainfall and irrigation.

A voltage analogous of the rate of rainfall is developed at 95 from data collected from the weather stations. This is labelled "rainfall rate" in the figure. No rainfall is represented by zero volts, and greater rainfall is represented by greater voltages. A current proportional to the rate of rainfall flows at 96 through the variable resistor 97 labelled rainfall scale factor, and charges the capacitor C. This causes an increase in the modelled soil moisture. The impedance of the rainfall scale factor resistor is determined by the particular location, and factors such as the portion of rainfall which is absorbed by the soil, rather than drained away and lost, etc.

A second method by which the modelled soil moisture can be increased is if irrigation is performed. Thus, if the model issues an "irrigate" command (in a manner to be described below) then relay Y is energized. Current flows from source 100 through the variable resistor 98 labelled "irrigation rate factor," and charges capacitor C. This, in turn, increases the modelled soil moisture. The irrigation rate factor resistor is adjusted to represent the particular installation; for example, large pumps would be modelled by a small value of the resistor, and corresponding large currents.

The results of the foregoing is the modelled soil moisture. It is an estimate of the water stored in the soil, and available to the plants. However, the model described so far has no provision for adjusting the model to approximate the actual measured values of soil moisture. The following is one means to accomplish this correction, and prevent the model from becoming grossly different from actuality.

Voltages analogous to the measured soil moisture levels are developed. These are based on the data obtained from the soil sensor stations described previously. They are labelled "soil moisture levels" 101 in the figure; higher voltages represent greater measured moistures. These voltages are applied to a circuit 102 which produces as its output 103 a voltage analogous to the overall moisture level in the field and which is a function of levels 101. The exact functional relationship between the several soil moisture levels, and the representative single value, labelled "present water factor" in the figure could be any one of many. For example, one possibility would be for the present water factor to be the simple average of the several soil moisture levels. Another possibility might be to use the lowest of the soil moisture levels, thus basing actions on the dryest. Another might be to use the tenth percentile, or other means. In any case, a single voltage analogous of the overall actual condition of soil moisture is developed at 103.

The modelled soil moisture signal 92 is then compared with the actual overall soil moisture (signal 103) in a differencing circuit 104. The output 105 of this differencing circuit is a correction factor which represent error in the model when compared to actuality.

This correction factor is passed through a low pass circuit 106 which eliminates short term difference, and develops a signal 107 labelled "long term averaged difference." This voltage is analogous to the long term difference between the modelled soil moisture and the observed soil moisture. The long term averaged difference signal 107 is summed in summing circuit 109 with the modelled soil moisture signal 42 to produce a signal 110 labelled "corrected modelled soil moisture" in the figure. This is the model's best estimate of the soil moisture.

Another input to the system is a voltage 111 labelled "desired soil moisture level" in the figure. This could be set by a potentiometer at 112 if it remains relatively constant, or could be generated by a device such as is shown in FIG. 9. This is analogous to the desired level of moisture in the soil; and depends on the crop type, location and other factors; and may in some cases vary through the growing season.

The desired soil moisture can also be set to a very high value or a very low value, using the switch labelled "override control" 113. In any case the desired soil moisture is compared with the corrected modelled soil moisture, in the comparator 114. If the desired moisture is less than the corrected model, then the output 115 of the comparator goes high, and irrigation is commenced via pump controls 61 and 62. A display 116 also indicates the beginning of irrigation, and relay Y is energized, so that the modelled soil moisture can be adjusted to reflect the beginning of irrigation. When the corrected model of soil moisture reaches the level of the desired moisture, the output of the comparator goes low, a command to discontinue irrigation is issued, and relay Y is deenergized.

Thus, the model shown in the figure and described here is one means to provide a predictive model of soil moisture, and an optimal means of irrigation control.

Certain signals used by the model described previously may vary throughout the growing season. These include the consumptive use of water by plants; and also the desired soil moisture levels. FIG. 9 shows one means to develop these signals.

A narrow, parallel beam of light 120 is generated. One known way to do this would be with a lens system and shutters. This beam of light is directed through a strip of photographic film 121 of other material which has been prepared with a clear (transparent) region 122 and an opaque region 123. The strip of film is slowly moved from a supply spool 124 to take-up spool 125 during the course of the growing season. At any time in the season, the portion of the film through which the light shines has a transparent area which is analogous to the value of the appropriate signal (consumptive use) at that time.

The light which then passes through the strip is proportional to the portion of the strip which is transparent. The light is concentrated by a lens 126 and is used to illuminate a photocell 127. Thus, the voltaged developed by the photocell is representative of the desired signal. A very slow speed drive for the take-up spool is indicated at 128.

Representative commercially available components indicated in blocks in the above description, are listed as follows:

| Components | Model and Manufacturer |
|---|---|
| 11 | Digital Equipment Corp. PDP-11/70 Computer |
| 16 | Digital Equipment Corp. PDP-11/03 Computer |
| 20 | Rainbird EP-300-F |
| 27 | Irrometer |
| 33 | Photowatt International MA 2320 |
| 35 | Motorola MC7812 |
| 38 | REPCO 810-055 |
| 40 | National Semiconductor LX 1702 AFN |
| 41 | National Semiconductor LX 1702 AFN |
| 42 | Creative Micro Systems 9651-509 |
| 43 | REPCO 810-038 |
| 44 | Weather Measure T 621 |
| 45 | Weather Measure W 121 |
| 46 | Weather Measure W 121 |
| 47 | Weather Measure H 352 |
| 48 | Weather Measure R 413 |
| 49 | Weather Measure P532 |
| 50 | Creative Micro Systems 9651-513 |
| 51 | REPCO 810-038 |
| 52 | REPCO 810-055 |
| 60 | REPCO 810-055 |
| 61 | Creative Micro Systems 9651-505 |
| 63 | Westinghouse BF-02-F |
| 64 | General Electric DSW 43 |
| 65 | Creative Micro Systems 9651-513 |
| 66 | REPCO 810-038 |
| 67 | Brooks Instruments 10 |
| 71 | RACAL-VADIC VA 305 |
| 72 | Teletype 43 |
| 74 | REPCO 810-055 |
| 75 | REPCO 810-038 |
| 79 | National Semiconductor LM 324 |
| 80 | National Semiconductor LM 324 |
| 90 | National Semiconductor LM 324 |
| 102 | National Semiconductor LM 324 |
| 104 | National Semiconductor LM 324 |
| 106 | National Semiconductor AF-150 |
| 109 | National Semiconductor LM 324 |
| 114 | National Semiconductor LM 311 |

I claim:
1. In irrigation control apparatus, the combination comprising
   (a) a mast having a lower portion adapted to be removably inserted into the earth,
   (b) soil moisture sensing means associated with said lower portion of the mast to be inserted into the earth to controlled depth to sense moisture at the depth, and
   (c) data transmitting means on an upper portion of the mast and operatively connected with said sensing means for transmitting to a central station continuous measurement data corresponding to moisture levels continuously sensed by said (b) means at the location of the mast.

2. The apparatus of claim 1 wherein said sensing means comprises a tensionmeter carried by said lower portion of the mast and continuously connected to said (c) means.

3. The apparatus of claim 1 wherein said sensing means includes vertically spaced tensionmeters carried by said lower portion of the mast for establishing moisture gradient data.

4. The apparatus of claim 3 including a multiplicity of said masts with said (b) and (c) elements associated therewith, said masts inserted into the earth at selectively spaced locations in a field.

5. The apparatus of claim 1 including a computer at said central station operatively connected to the data transmitting means via data transmission link.

6. The apparatus of claim 4 including a computer at said central station operatively connected to said multiple data transmitting means associated with said masts, via multiple data transmission links.

7. The apparatus of claim 1 including a solar collector associated with said mast characterized as producing electrical energy used to power said data transmitting means.

8. The apparatus of claim 7 including a battery associated with said mast and connected with said collector to store said electrical energy.

9. The combination of claim 5 including an irrigation means operatively connected with said computer to commence irrigation in response to signals transmitted from said computer as a function of data transmitted from said data transmission means.

10. The combination of claim 9 wherein said irrigation means includes a motor driven pump to pump irrigation water.

11. The combination of claim 9 including a data transmission link between said irrigation means and said computer to transmit data from the computer to said irrigation means, and to transmit data concerning the status of said irrigation means to the computer.

12. The combination of claim 11 wherein said link is a radio link that incorporates a modem.

13. The apparatus of claim 9 wherein said computer includes first circuit means having inputs for data representative of actual soil moisture level, and of modulated desired moisture level, for producing a control output which is a function of a comparison of said actual and modulated desired levels, said first computer means operatively connected with said irrigation means so that said control output controls said irrigation means.

14. The apparatus of claim 13 wherein said computer also includes summing circuitry having inputs for data representaive of temperature, sun intensity, humidity, soil characteristic and consumptive use of water by plants, thereby to derive a summed output, and other circuitry modulated by said summed output and also by data representative of actual soil moisture level for producing an output signal representing said desired soil moisture level.

15. In the method of controlling irrigation of plants in a field, and employing a unit including a mast having a lower portion adapted for removable insertion into the earth, and soil moisture sensing means associated with said lower portion, the mast having an upper portion and circuit means on said upper portion operatively connected with said sensing means for continuously transmitting to a control station data indicative of actual soil moisture conditions of the soil at the mast local, the steps that include:

(a) vertically inserting said mast into the earth along in plant row, so that said sensing means is inserted to controlled depth below ground surface level, (b) operating said sensing means to continuously produce said data, (c) operating said circuit means to transmit said continuous data to said control station, (d) processing said data to derive an output which is a function of actual soil moisture level and desired soil moisture level, and (e) using said output to control irrigation of said plants in the field.

16. The method of claim 15 wherein multiple of said units are employed, the additional steps that include:

(f) selectively locating said units in different zones of said field, (g) maintaining data communication between said units and said control station, so that an output as in (d) is derived for each unit, (h) providing irrigation means, and (i) said (e) step including using each of said outputs to control said irrigation means.

17. The method of claim 16 wherein said irrigation means comprise water flow control devices, and wherein said outputs are used to control the respective devices.

18. The method of claim 15 wherein said control station includes computer means incorporating first circuit means having inputs for said data representative of actual soil moisture level as sensed by said sensing means, and of modulated desired soil moisture level, for producing said output which is a function of a comparison of said actual and modulated desired levels, and including the step of operating said computer means to produce said control output which is then used to control irrigation as in step (e) of claim 15.

19. The method of claim 18 including the step of providing said modulated desired soil moisture level by providing input signals corresponding to temperature, sun intensity, humidity, soil characteristic, and consumptive use of water by the plants, at said field, summing said input signals to produce a summed output, and using said summed output to modulate said data representative of actual soil moisture level.

20. In irrigation control apparatus, the combination comprising (a) a mast having a lower portion adapted to be removably inserted into the earth, (b) soil moisture sensing means associated with said lower portion of the mast, and (c) data transmitting means on an upper portion of the mast and operatively connected with said sensing means for transmitting to a central station data indicative of soil moisture conditions at the location of the mast, (d) said sensing means including vertically spaced tensiometers carried by said lower portion of the mast for establishing moisture gradient data at a known spacing, (e) there being a multiplicity of said masts with said (b) and (c) elements associated therewith, said masts inserted into the earth at spaced locations in a field or fields, (f) and a computer at said central station operatively connected to said multiple data transmitting means associated with said masts, via multiple data transmission links.

21. The combination of claim 20 including an irrigation means operatively connected with said computer to commence irrigation in response to signals transmitted from said computer as a function of data transmitted from said data transmission means.

22. The combination of claim 21 including a data transmission link between said irrigation means and said computer to transmit data from the computer to said irrigation means, and to transmit data concerning the status of said irrigation means to the computer.

23. The combination of claim 21 wherein said computer includes first circuit means having inputs for data representative of actual soil moisture level, and of modulated desired moisture level, for producing a control output which is a function of a comparison of said actual and modulated desired levels, said first computer means operatively connected with said irrigation means so that said control output controls said irrigation means.

* * * * *